United States Patent [19]

Hatakeyama et al.

[11] Patent Number: 4,990,933

[45] Date of Patent: Feb. 5, 1991

[54] COLOR THERMAL PRINTER

[75] Inventors: Atsushi Hatakeyama; Wayne F. Niskala; Seishi Ohmori, all of Tokyo, Japan

[73] Assignee: Eastman Kodak Company, Rochester, N.Y.

[21] Appl. No.: 534,064

[22] Filed: Jun. 6, 1990

[30] Foreign Application Priority Data

Feb. 15, 1990 [JP] Japan .................................... 1-35245

[51] Int. Cl.[5] ......................... G01D 15/10; B41J 2/315

[52] U.S. Cl. ................................. 346/76 PH; 400/120

[58] Field of Search ..................... 346/76 PH; 400/120

[56] References Cited

U.S. PATENT DOCUMENTS

| | | | |
|---|---|---|---|
| 4,642,655 | 2/1987 | Sparer et al. .................... | 346/76 PH |
| 4,660,053 | 4/1987 | Tsutsumi et al. .............. | 346/76 PH |
| 4,829,320 | 5/1989 | Une et al. ........................ | 346/76 PH |

*Primary Examiner*—Bruce A. Reynolds
*Assistant Examiner*—Huan Tran
*Attorney, Agent, or Firm*—Raymond L. Owens

[57] ABSTRACT

A color thermal printer which offers good color registration when plural colors are to be printed on a print receiver. The position of the printing area can be adjusted easily and precisely by controlling the rotation of a drum which carries the print receiver. Also, the diameter of the platen roller is not restricted by the length of the print receiver being used.

2 Claims, 8 Drawing Sheets

COLOR THERMAL PRINTER

BACKGROUND OF THE INVENTION

1. Field of the Invention

The present invention relates to a color thermal printer in which heat applied by a thermal print-head is used to heat ink donor film to transfer ink to a print receiver of paper or other such material. It particularly relates to a drum type color thermal printer in which the print receiver is moved by the rotation of a drum.

2. Description of the Prior Art

In a color thermal printer, a print receiver such as paper, for example, and an ink donor film are fed between a thermal print-head and a platen roller, and the thermal print-head is heated to transfer the ink to the receiver.

FIGS. 5 and 6 show an example of the print receiver transport mechanism and printing section in a conventional color thermal printer.

FIG. 5 shows an example of a color thermal printer which employs a reciprocating receiver transport system. In the drawing, a paper receiver 10 is pinched between two sets of pinch rollers 12 and 14, and is moved backwards and forwards by the rotation of these pinch rollers. The rotation of the pinch rollers 12 and 14 feeds the print receiver 10 through a gap between a platen roller 16 and the thermal print-head 18 which constitutes a transfer section.

An ink donor film 20 is also fed through this transfer section, on the print receiver 10. This ink donor film 20 is moved in unison with the movement of the print receiver 10. The heat of the thermal print-head 18 is used to selectively transport ink from the ink donor film 20 to the print receiver 10 located between the platen roller 16 and the thermal print-head 18.

FIG. 6 illustrates a color thermal printer in which the print receiver 10 is moved in one direction only by a rotational mechanism. Here, the platen roller is constituted by a platen drum 28. The platen drum 28 is provided with a gripper 30, which clamps the print receiver 10 onto the surface of the platen drum 28. Film rollers 22 and 24 are provided for the same purpose described with reference to FIG. 5, i.e. to transport the thermal print-head 18 and the ink donor film 20.

The operation of the printers shown in FIGS. 5 and 6 will now be described. With reference first to FIG. 5, the print receiver 10 is drawn out by the pinch rollers 12 and fed, in contact with the surface of the platen roller 16, through the transfer section between the thermal print-head 18 and the platen roller 16. The transport of the print receiver 10 is continued to bring the leading edge of the print receiver between the second set of pinch rollers 14. During this part of the operation the thermal print-head 18 is retracted away from the platen roller 16, and the ink donor film 20 is moved on until it is in the prescribed position.

Next, the thermal print-head 18 is held against the platen roller 16 at a prescribed pressure and the thermal transport process begins. During the thermal transport process the print receiver 10, held by the frictional force of the pinch rollers 12, is printed while it is being transported in the direction indicated by the arrow 100 by the rotation of the pinch rollers 14 and the platen roller 16. The pinch rollers 12 and 14 and the platen roller 16 are rotated in unison to keep the print receiver 10 smooth and taut, and the ink donor film 20 is wound onto the film roller 22 at a rate which matches the speed at which the print receiver 10 is being transported. At the point at which the transfer of a color is completed, it is necessary that the trailing edge of the print receiver 10 is still being held between the pinch rollers 12. To print the next color, the receiver 10 has to be transported back to a predetermined transfer start position. To do this, the thermal print-head 18 is retracted away from the platen roller 16 and the ink donor film 20 is moved to a prescribed position (the position at which the ink of the desired color is located). During this operation the print receiver 10 is transported in the direction indicated by the arrow 200 by the reverse rotation of the pinch rollers 12 and 14 until the home position is reached. Each color is thus printed, i.e. thermally transferred, by the above cycle of operations, so to completion of the thermal color printing is effected by repeating this cycle of operations a number of times which corresponds to the number of colors which have to be transferred. A three-color printing (yellow, magenta and cyan, for example) would be accomplished by repeating the above cycle of operations three times.

Next, with reference to the operation of the conventional apparatus illustrated by FIG. 6, with the print receiver 10 held in position on the platen drum 28 by the gripper 30 the platen drum 28 is rotated until the home position is reached. During this rotation the thermal print-head 18 is maintained in a position of retraction from the platen drum 28 and the ink donor film 20 is moved until it is at the necessary position for commencing the transfer printing. The rotation of the platen drum 28 is stopped when it reaches the home position, and the thermal print-head 18 is brought into contact with, and presses against, the platen drum 28 at a prescribed pressure, and the ink transfer begins. When the transfer of a color is completed, which is when the platen drum 28 has described one revolution in the direction indicated by the arrow 300, the next color is transferred by another revolution of the platen drum 28 in the direction indicated by the arrow 300, starting from the home position. Thus, a three-color transfer printing operation would involve three such revolutions by the platen drum.

The conventional color thermal printers described above have the following drawbacks. In the case of the reciprocating system illustrated in FIG. 5, the print receiver 10 is transported by the frictional force of each of the two sets of pinch rollers 12 and 14. To ensure that the print receiver 10 is maintained in a state of tension during its transportation requires that the pressure and frictional force of each of the sets of pinch rollers 12 and 14 be maintained at a constant level, for which an adjusting mechanism is needed. Also, to prevent deviation in color registration starting from the transfer of the second color the print receiver 10 has to be positioned precisely, but with these conventional color thermal printers positional detection and alignment of the print receiver 10 is difficult. Since the unidirectional transport system used in the color thermal printer shown in FIG. 6 is arranged so that the transfer of one color is effected with one revolution of the platen drum 28, it solves the positional alignment problem of the apparatus of FIG. 5. However, the diameter of the platen drum 28 has to be determined in accordance with the length of the print receiver 10 sheets in the direction of transportation. As such, an increase in the size of the print receiver 10 has to be accompanied by a corresponding increase in the diameter of the drum 28, and hence in the radius of curvature r of the drum. The result is a marked increase in the area of contact between the thermal print-head 18 and the platen drum 28, which in turn results in parts of the thermal print-head 18 other than the printing portions coming into contact with the platen drum 28. The consequence of this is that when used as a line printer, the thermal print-head 18 has to be pressed against the platen drum 28 with a very large force in order to produce good-quality printing, which makes the thermal print-head susceptible to damage.

Moreover, an increase in the size of the platen drum 28 has to be matched by a corresponding increase in the size of the thermal print-head 18, thereby increasing both the cost and the overall size of the apparatus.

SUMMARY OF THE INVENTION

The object of the present invention is to overcome the drawbacks of the systems described above by providing a color thermal printer which enables the position of the receiver printing area to be aligned with speed and precision and can be made more compactly and at a lower cost than conventional color thermal printers. To attain the above object, the color thermal printer according to the present invention comprises a color thermal printer comprising a platen roller; a printing section having a platen roller and a movable thermal print-head which is arranged in opposition to the platen roller and which is movable between open and printing portions; an ink donor film overlaid on the print receiver and having a multiplicity of colored inks, which is moved in unison with the movement of the print receiver through a transfer section formed by a gap between the platen roller and the open thermal print-head; a rotatable drum arranged in the vicinity of the printing section which can be controllably rotated in two directions the drum having a wall provided with an aperture, receiver support means provided in the interior of the drum for mounting a roller of printer receiver so that the print receiver passed through such aperture; gripper means located exterior to the drum which rotates together with the drum and is switchable between clamping the print receiver against the drum and releasing the print receiver; means coupled to the drum for rotating the drum to the print receiver through the transfer section; wherein when the receiver is being wound on said support means, the print head is in a closed position and presses the donor film and receiver against the platen roller and the gripper means clamp the receiver to the drum so that colored ink is selectively transferred to the receiver while the print receiver is being moved in contact with the drum.

With the color thermal printer thus configured the print receiver is supported by the drum, in contrast to 15 the conventional arrangement illustrated in FIG. 6 in which the print receiver is wound directly onto the platen drum. This enables the diameter of the platen roller to be set to an appropriate size rather than having to be set in accordance with the length of the print receiver or printing area. As the print receiver can be clamped in position by the gripper the print receiver can be transported by rotating the drum, that is, in contact with the surface of the drum. Carrying out the transfer printing process during this transportation operation provides accurate, good-quality transfer printing. With this arrangement, during the transfer operation the extent of the reverse travel to which the print receiver is subjected as well as the speed of this reverse travel may be controlled by controlling the angle and speed of rotation of the drum, which increases the adjustment accuracy of the transfer position when a plural colors are being printed one after another.

Further features of the invention, its nature and various advantages will be more apparent from the accompanying drawings and the following detailed description of the invention.

DETAILED DESCRIPTION OF THE PREFERRED EMBODIMENT

Figure 1:
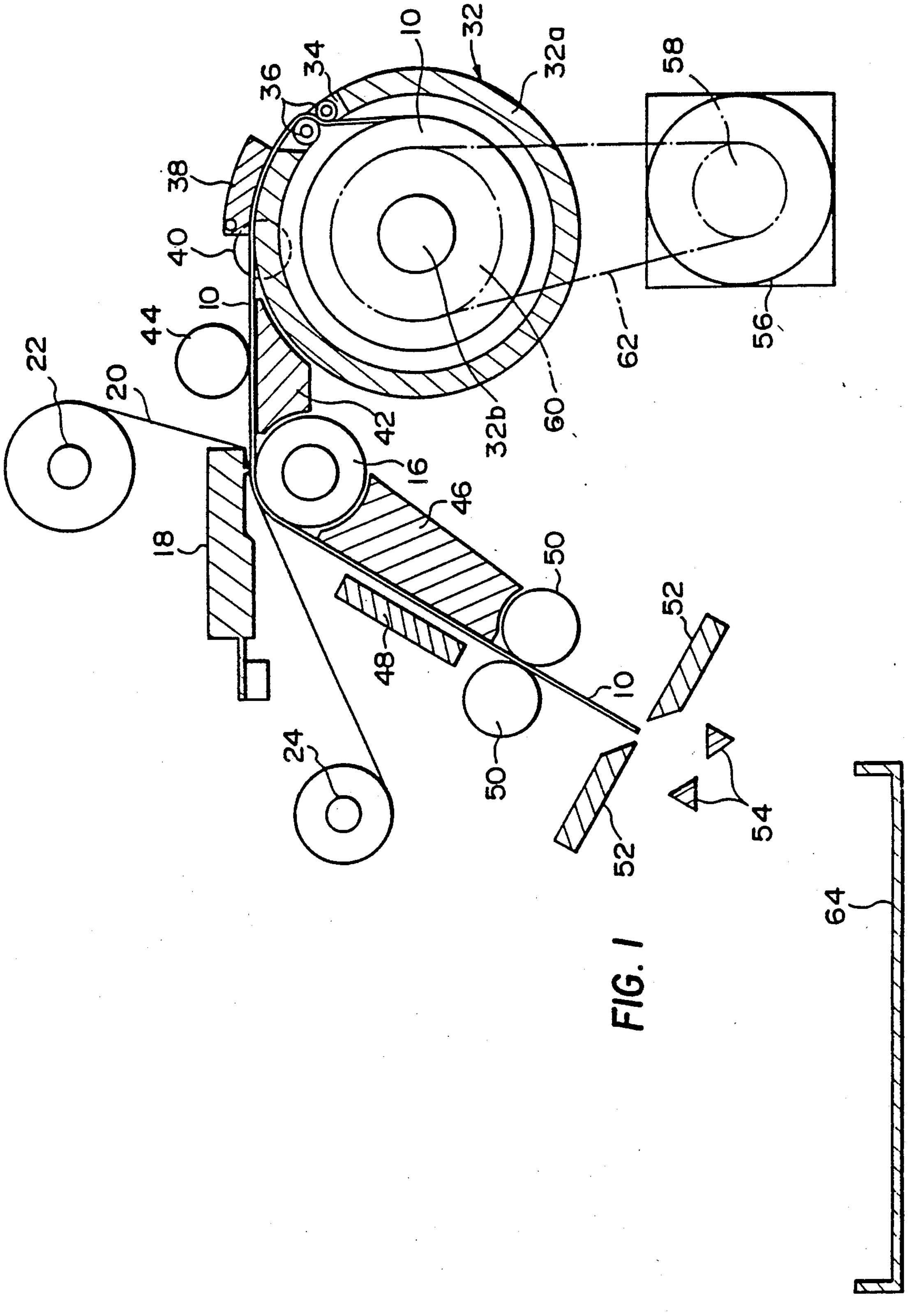
FIG. 1 is a drawing of the general construction of an embodiment of the present invention.
Figure 2A:
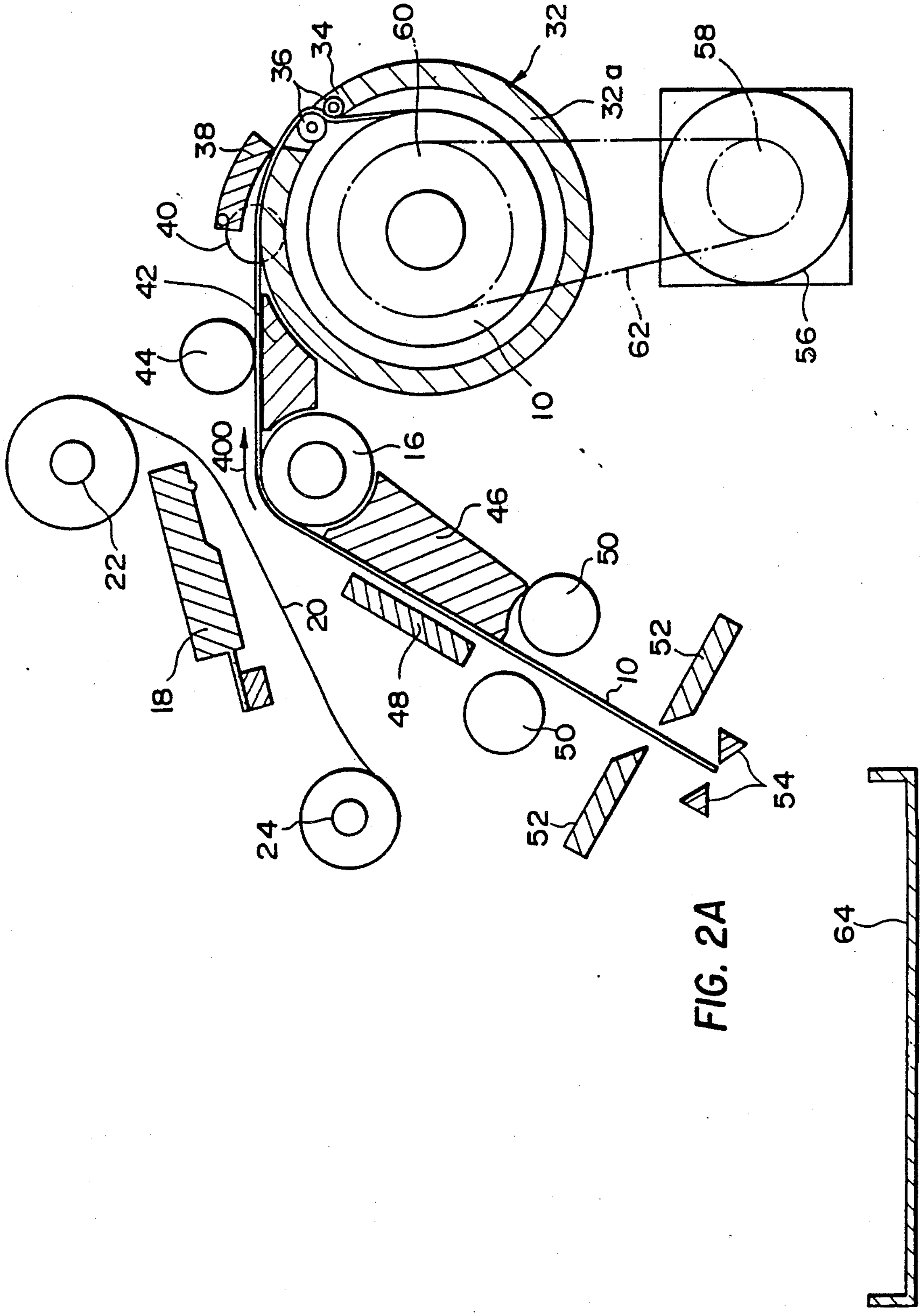
FIGS. 2(A) to (E) are drawings to illustrate details of the operation of the embodiment.
Figure 2B:
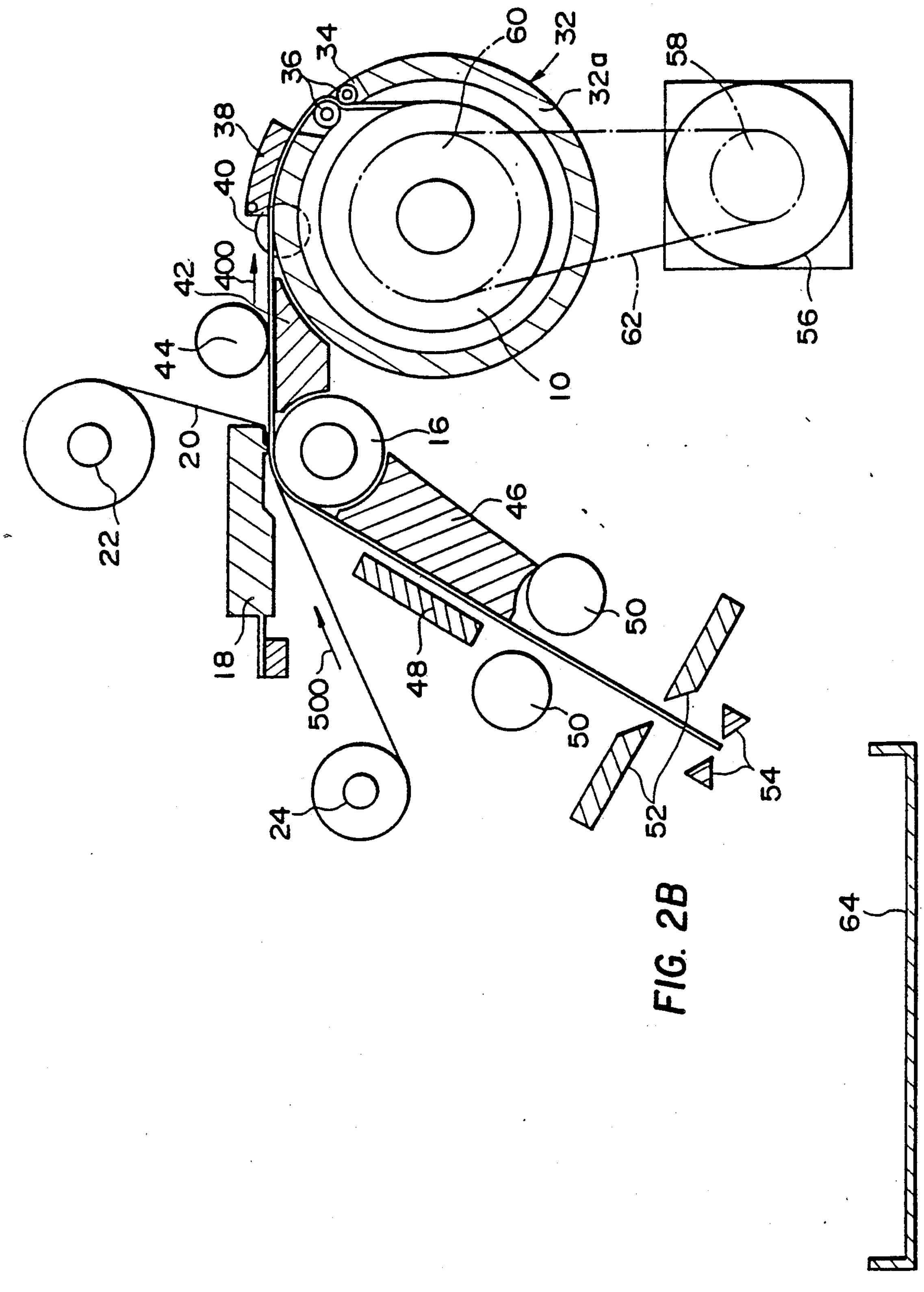
Figure 2C:
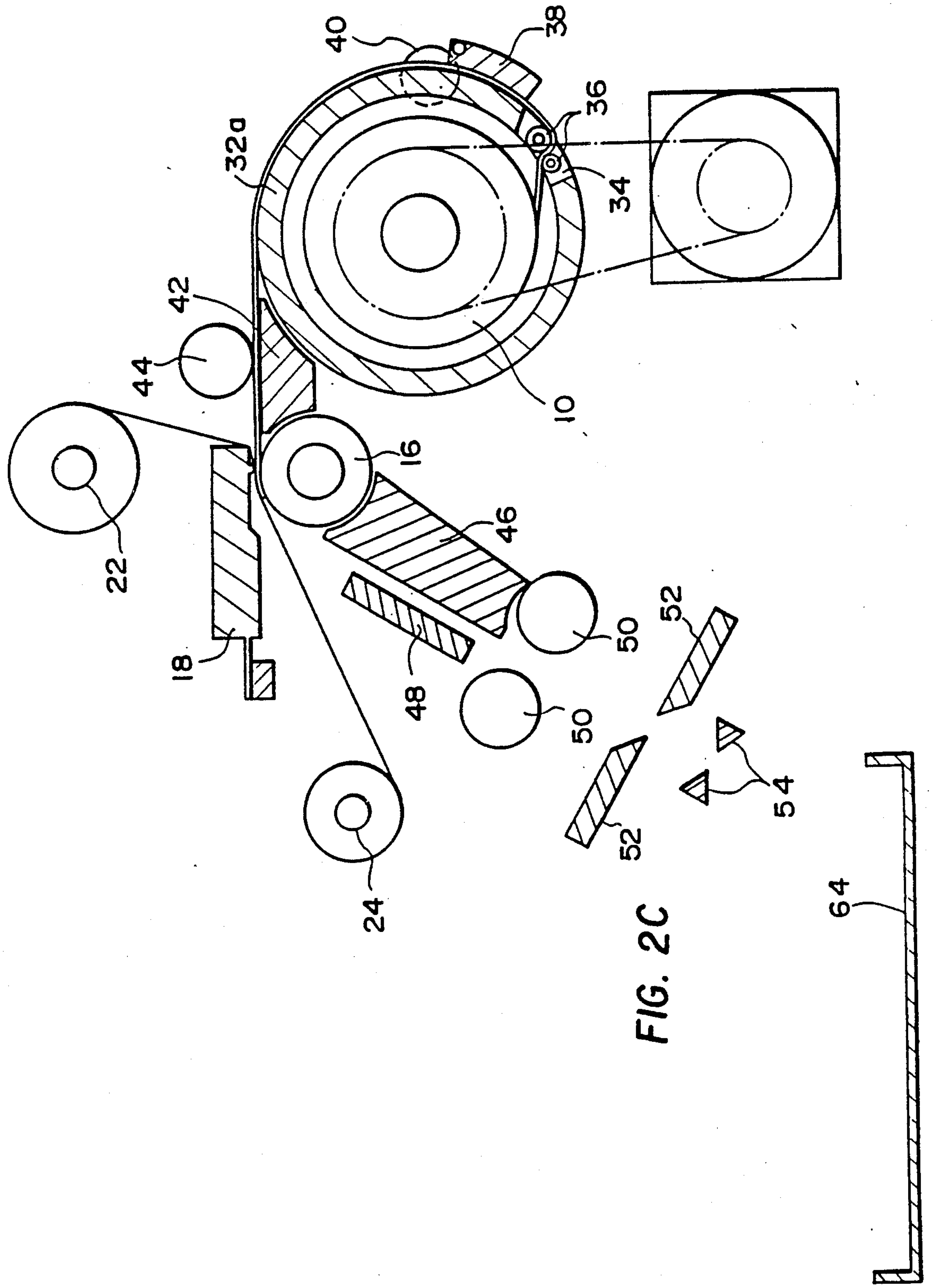
Figure 2D:
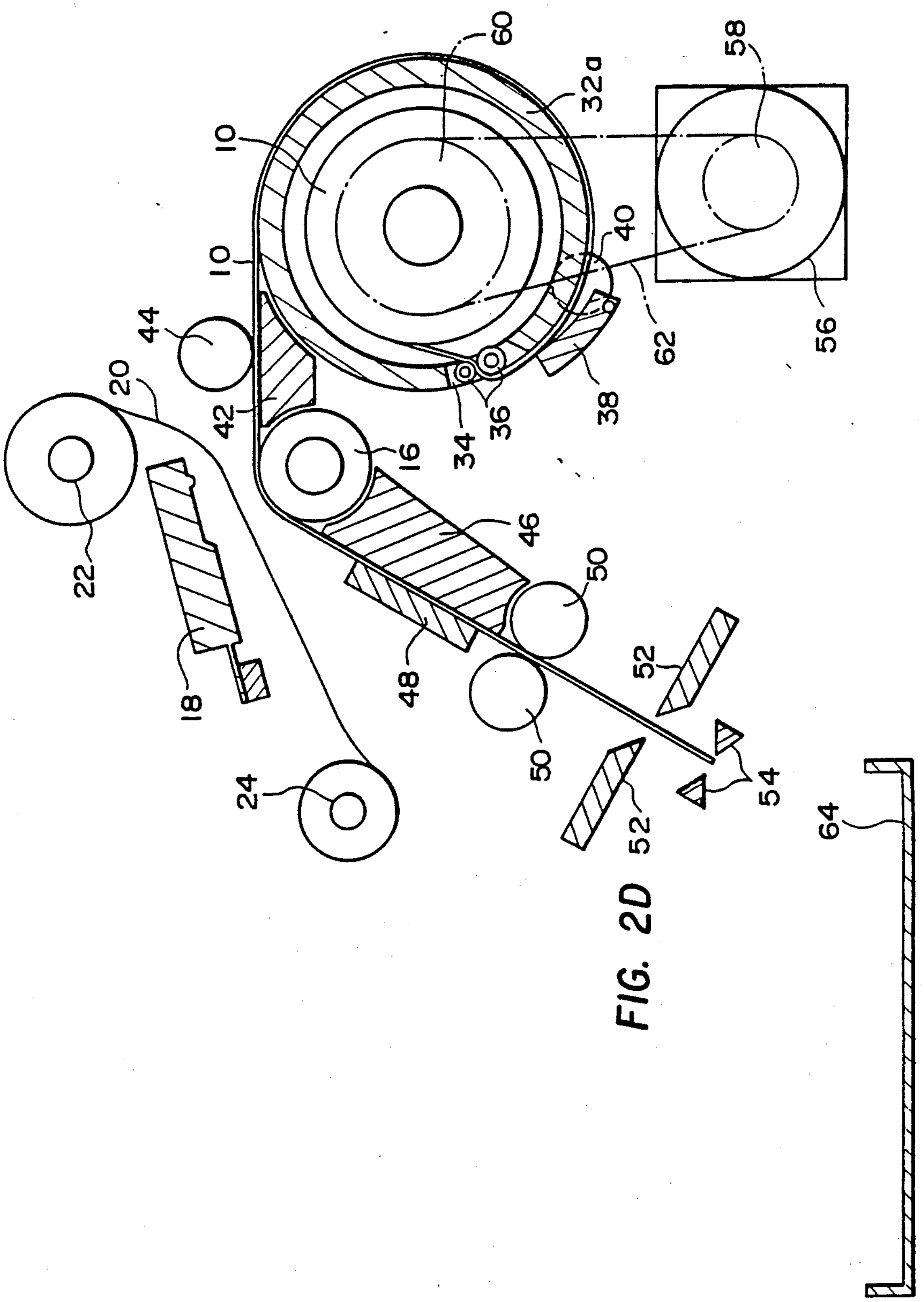
Figure 2E:
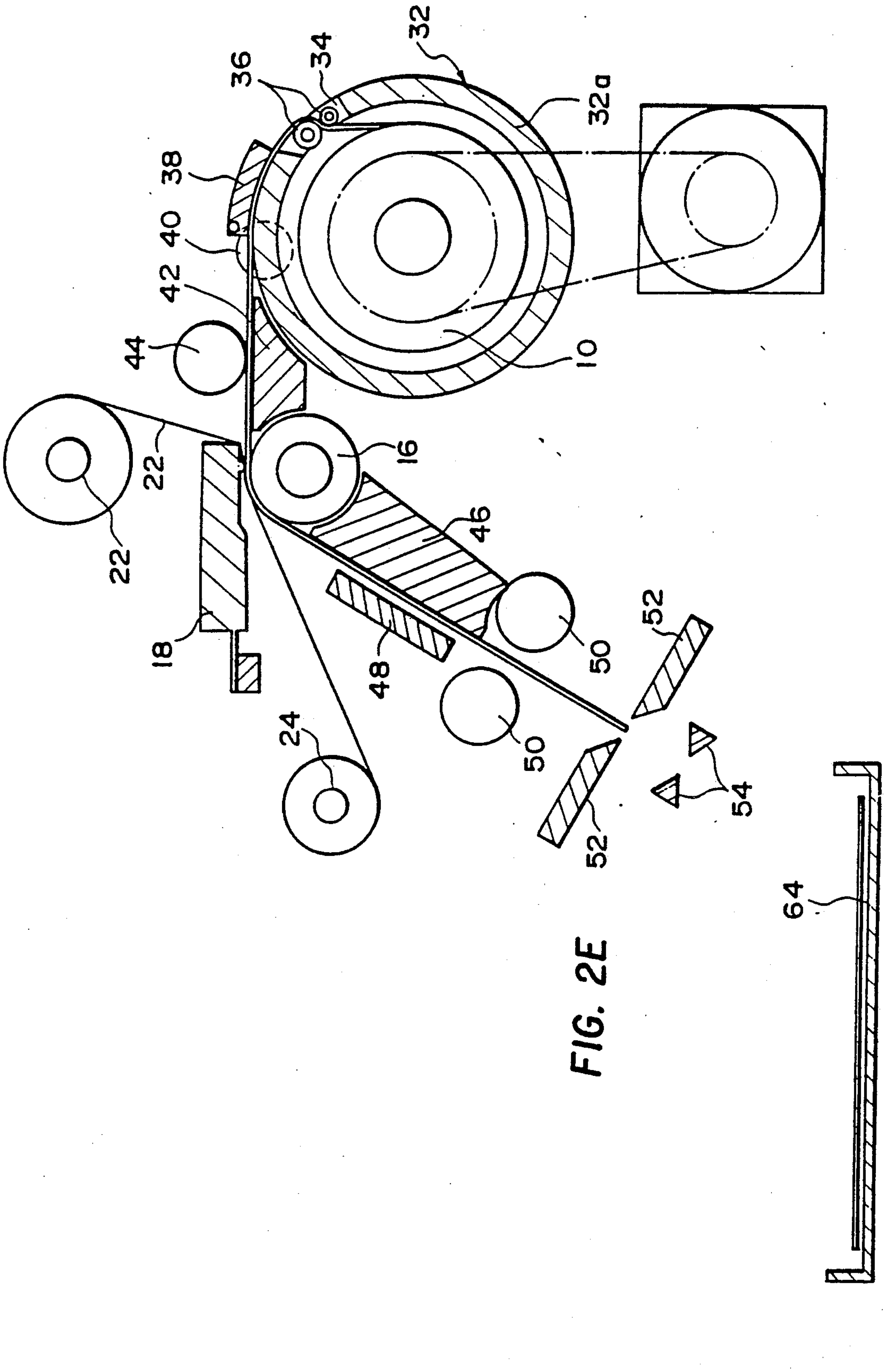
Figure 5:
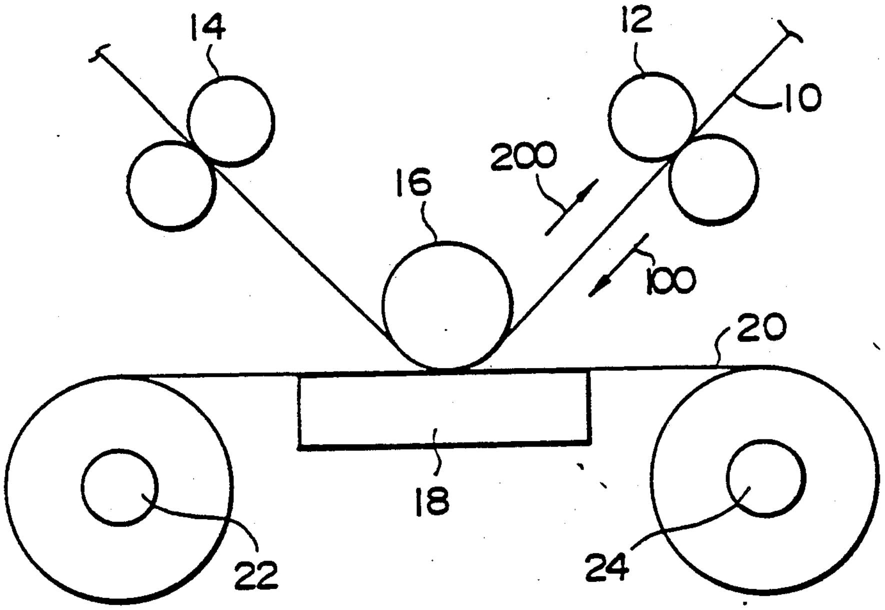
FIG. 5 (prior art)
FIGS. 5 and 6 are drawings showing the construction of the principal parts of conventional color thermal printers.

A first embodiment of the invention will now be described with reference to the drawings. FIG. 1 shows the general configuration of an embodiment of the color thermal printer according to the present invention. Elements that are the same as those in the conventional arrangements shown in FIGS. 5 and 6 have the same reference numerals.

In FIG. 1, a drum 32 which supports the print receiver 10 is comprised of an outer cylinder 32*a* and an inner cylinder 32*b*; the print receiver 10 is provided in the form of a roll inside the inner cylinder 32*b*. Two guide rollers 36 are provided in opposition to each other at a print receiver slit 34 formed in the outer cylinder 32*a* of the drum 32. The guide rollers 36 are arranged so as to draw the print receiver 10 from the roll on the inner cylinder 32*b* out onto the surface of the outer cylinder 32*a*. The guide rollers 36 may be driven to effect the feeding-out of the print receiver 10 automatically, or non-driven, in which case an operator would draw out the print receiver manually.

A gripper 38 is provided in the vicinity of the print receiver slit 34 in the outer cylinder 32*a* via which the print receiver 10 is drawn out by the guide rollers 36. The gripper 38 is arranged so that it rotates together with the drum 32 and can be switched between a state in which it holds the print receiver 10 against the surface of the outer cylinder 32*a* and a state in which the print receiver is released. These functions of the gripper 38 are implemented by a gripper cam 40 which is positioned in contact with the gripper.

Provided at a position along the direction of travel of the print receiver 10 are a receiver guide 42 and a feed roller 44 for guiding the print receiver 10 to a printing section comprised of a platen roller 16 and a thermal print-head 18. The feed roller 44 helps to feed the print receiver 10 to the printing section.

A guide plate 46 is provided at a position further downstream along the direction of print receiver 10 travel, and a brake 48 is arranged opposite the guide plate 46. From the printing section, the print receiver 10 passes along the guide plate 46. The brake 48 can stop the print receiver 10 by pressing it against the guide plate 46 at a prescribed pressure.

Two back rollers 50 are provided downstream of the guide plate 46. These back rollers 50 can be brought into contact with the print receiver 10 or retracted therefrom. The back rollers 50 are driven to enable them to feed the print receiver 10 further ahead.

Provided at a position downstream of the back rollers 50 are print receiver cutters 52 for cutting the print receiver 10 into predetermined lengths. Downstream of the print receiver cutters 52 is a print receiver edge sensor 54 which is to detect the leading edge of the print receiver 10.

A motor 56 is provided to rotate the drum 32. A timing belt 62 running between a drive pulley 58 affixed to the shaft of the motor 56 and a follower pulley 60 on the shaft of the drum 32 enables the rotation of the drum 32 to be controlled by controlling the rotation of the motor 56. Similarly to the conventional arrangement, an ink donor film 20 is provided so that it moves together with the print receiver 10 between the platen roller 16 and the thermal print-head 18.

The operation of the apparatus thus configured according to this embodiment will now be described, starting with printing preparation.

FIG. 2 (A) shows the drum 32 at rest at the home position. With the gripper 38 raised by the gripper cam 40 the print receiver 10 has been released and can be moved by the feed roller 44 between the feed roller 44 and the print receiver guide 42. The thermal print-head 18 has been retracted away from the platen roller 16 by a prescribed amount, the brake 48 has been retracted from the guide plate 46 by a prescribed distance and the back rollers 50 have been retracted away from each other, also by a prescribed distance. The print receiver cutters 52 are open to allow the print receiver 10 to pass through towards the print receiver edge sensor 54.

The print receiver 10 is drawn out via the print receiver slit 34 by the rotation of the guide rollers 36 and fed across the surface of the drum 32 and up to the feed roller 44. The rotation of the feed roller 44 while it presses the print receiver 10 against the print receiver guide 42 at a prescribed pressure feeds the print receiver 10 on to the platen roller 16, from where it is moved along past the guide plate 46 and the back rollers 50 and on towards the print receiver edge sensor 54.

When the leading edge of the print receiver 10 is detected by the print receiver edge sensor 54 the rotation of the guide rollers 36 and feed roller 44 is stopped and the gripper can 40 turns, causing the gripper 38 to press and hold the print receiver 10 against the surface of the drum 32. The back rollers 50 then close and rotate to urge the print receiver 10 in the direction of the print receiver edge sensor 54. As the print receiver 10 is held at the drum 32 end by the gripper 38, this stretches the print receiver 10 tautly over the surface of the platen roller 16.

The print receiver 10 is then pressed by a prescribed pressure against the guide plate 46 by the brake 48. While this is happening the ink donor film 20 is being moved to bring the part with the first color to the required position. The ink donor film 20 and receiver 10 are then pressed against the platen roller 16 at a prescribed pressure by the thermal print-head 18. The final preparatory operation prior to printing is to release the brake 48 and retract the back rollers 50.

FIG. 2 (B) shows the printing operation being started following the completion of the printing preparation. The printing sequence will now be described, starting with the first color. The printing proceeds as the print receiver 10 is moved in the direction of the arrow 400 by the clockwise rotation of the drum 32 by the motor 56. The extent of the movement by the print receiver 10 is determined by the degree of rotation of the drum 32, and the printing range can be set as desired by adjusting this angle. During the printing of the print receiver 10 the ink donor film 20 is moved together with the print receiver 10 in the direction of the arrow 500.

With this arrangement, the travel precision, and hence printing precision, can be improved by raising the rotational precision of the drum 32.

FIG. 2 (C) shows the apparatus at the completion of this printing operation. Thus, the rotation of the drum 32 stops upon completion of the printing of the first color and the thermal print-head 18 and feed roller 44 are retracted from the print receiver 10 to a prescribed stand-by position. The brake 48 is released and the back rollers 50 also are retracted. With the print receiver 10 clamped onto the surface of the drum 32 by the gripper 38, the drum 32 is then rapidly rotated counterclockwise by the motor 56 until it reaches the home position, when it is stopped. As the print receiver 10 is being held by the gripper 38 which turns together with the drum 32, the print receiver 10 is moved by the counterclockwise rotation of the drum 32 to the position at which printing preparation was completed (FIG. 2 (B)). The gripper 38, brake 48 and back rollers 50 go through the same sequence of operations followed during printing preparation to draw the print receiver 10 tightly across the platen roller 16, during which time the position of the ink donor film 20 is being adjusted for the printing of the second color.

The thermal print-head 18 then uses a prescribed pressure to press the ink donor film 20 and receiver 10 against the platen roller 16 for the printing of the second color. This cycle of preparation and printing operations are repeated by a number of times which correspond to the number of colors to be printed, three cycles for three colors, four cycles for four colors and so on until the printing of one sheet is completed.

The home position of the print receiver 10 for the second color onwards is determined by the degree to which the drum 32 can be rotated without the print receiver 10 being detected by the print receiver edge sensor 54. For example, if the print length of the first color on the first sheet is set as an angle of drum rotation of 120 degrees, upon completion of the printing the drum is rotated 120 degrees counterclockwise and preparation begins for the printing of the second color.

The sequence of operations from the completion of the first receiver sheet to the start of printing of the second sheet will now be described. When printing of the first receiver 10 sheet is completed the drum 32 is stopped at the position shown in FIG. 2 (C). At this point the thermal print-head 18 is in the retracted state, as when preparing for the printing of the first color, and the feed roller 44 is at a predetermined stand-by position. With the printed receiver 10 clamped onto the surface of the drum 32 by the gripper 38, the drum 32 is rotated rapidly counterclockwise by the motor 56 back to the home position. The print receiver 10 is moved along the print receiver guide 42 and the guide plate 46, towards the print receiver edge sensor 54. During this operation the feed roller 44 turns rapidly in unison with the rotation of the drum 32 to assist the movement of the print receiver 10.

The print receiver 10 is then rotated counterclockwise through the prescribed angle of rotation and the back rollers 50 close on the print receiver 10 and urge it in the direction of the print receiver edge sensor 54. As a result, the print receiver 10 is stretched tautly over the platen roller 16. The brake 48 is then worked to clamp the print receiver 10 against the guide plate 46, and this is followed by the gripper 38 being released by the gripper cam 40, thereby allowing the print receiver 10 and the drum 32 to be moved independently. Here rotating the drum 32 clockwise to the print receiver feed position shown in FIG. 2 (D) will cause a length of receiver 10 to be drawn out from the inner cylinder 32*b* which corresponds to the amount of rotation of the drum 32. That is, as the print receiver 10 is clamped in position by the brake 48, the amount of receiver 10 that will be drawn out through the print receiver slit 34 as the drum 32 is rotated will correspond to the angle of rotation (from the home position to the print receiver feed position).

When the drum 32 reaches the print receiver feed position the gripper 38 clamps the print receiver 10. After the brake 48 and the back rollers 50 are released the drum is again rotated counterclockwise to the home position, with the travel of the print receiver 10 being assisted by the feed roller 44 rotating in unison with the rotation of the drum 32. As a result the print receiver 10 passes beyond the print receiver cutters 52 by an amount corresponding to the rotation of the drum 32 to the print receiver feed position. The print receiver 10 is then cut by the print receiver cutters 52 and the printed cut sheet is collected in the tray 64. Printing of the second and subsequent pages can then proceed, with the thermal print-head 18 pressed against the platen roller 16. This state is shown in FIG. 2 (E).

Thus, with the arrangement of this embodiment the printing area on the print receiver 10 can be set as desired by controlling the rotation of the drum 32. Also, the feeding-out of the print receiver 10 from the drum 32, the movement of the print receiver 10 accompanying the rotation of the drum 32 and the reverse travel of the print receiver 10 can be accomplished through the operation of the feed roller 44 and the gripper 38. In addition, the use of the back rollers 50 enables the print receiver 10 to be stretched taut when reversed, facilitating the transfer printing.

Figure 6:
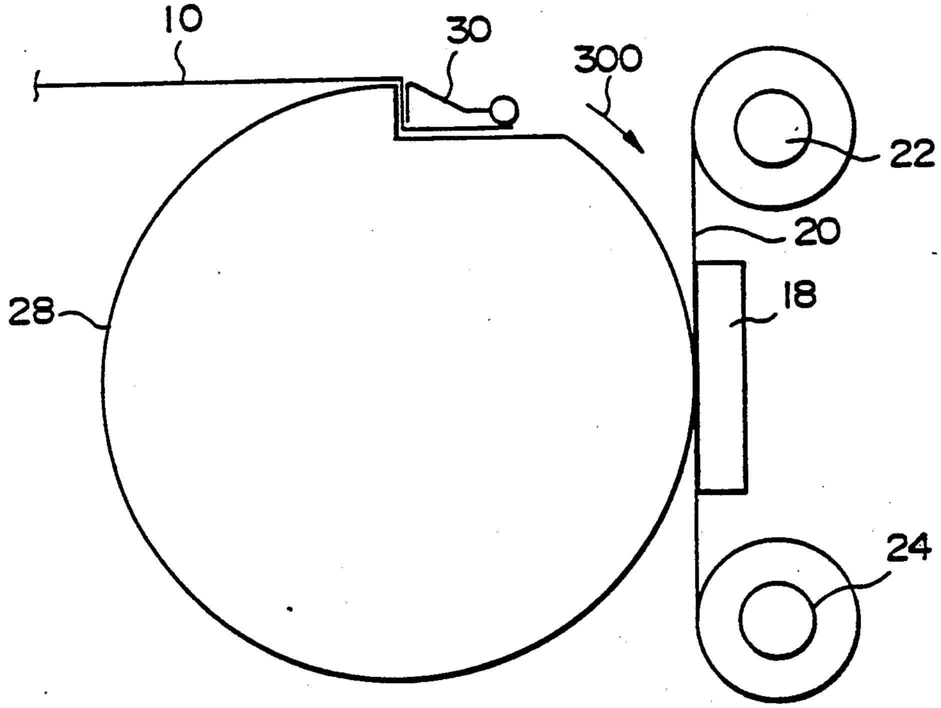
FIG. 6 (prior art)

Another advantage is that the diameter of the platen roller 16 is not at the mercy of the length of the print receiver 10 as it is in the case of the conventional arrangement illustrated by FIG. 6. Instead, the diameter of the roller can be reduced regardless of the size of the print receiver 10, thereby enabling good transfer printing to be achieved using a low platen pressure, which also helps to avoid damage to the heating elements of the thermal print-head 18. It also enables the length of the thermal print-head 18 in the direction in which the print receiver 10 is printed to be reduced, thereby enabling the size of the printing section to be reduced.

The configuration of the drum 32 is not limited to the configuration of the above embodiment. The drum 32 may, for example, be given the configurations shown in FIGS. 3 and 4.

Figure 3:
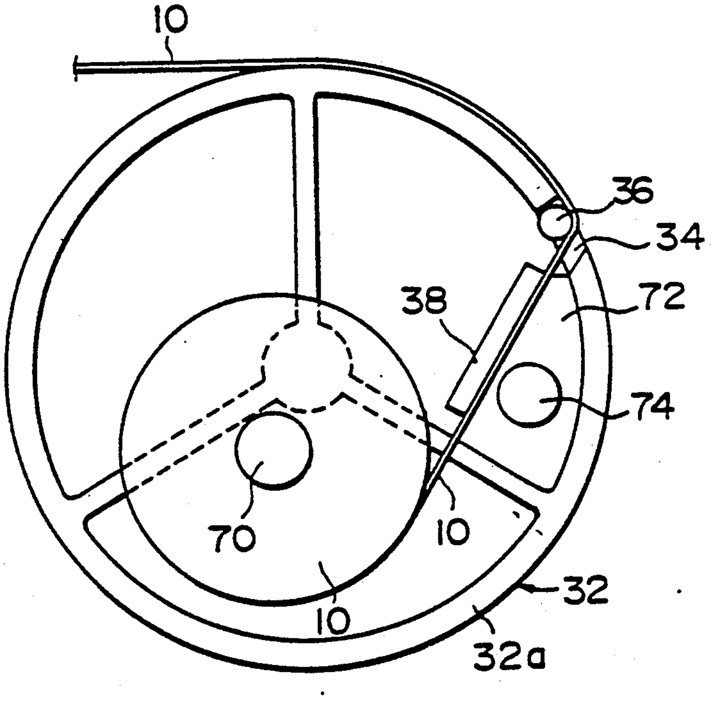
FIGS. 3 and 4 are drawings showing the arrangement of the drum according to another embodiment.

With reference to FIG. 3, a shaft 70 for holding a roll of receiver 10 is provided in the outer cylinder 32*a* at a position which is offset relative to the axis of rotation of the drum 32. Also, the gripper 38 is provided inside the drum 32 in an arrangement whereby the print receiver 10 is held between the gripper 38 and a gripper base 72 provided for the purpose. A cam 74 is used to operate the gripper 38. The print receiver 10 is fed past the gripper 38 and out through the print receiver slit 34 by guide roller 36. By providing the shaft 7 where it is offset relative to the axis of drum rotation and locating the gripper 38 inside the drum 32, this arrangement permits virtually the whole of the drum exterior to be effectively utilized.

Figure 4:
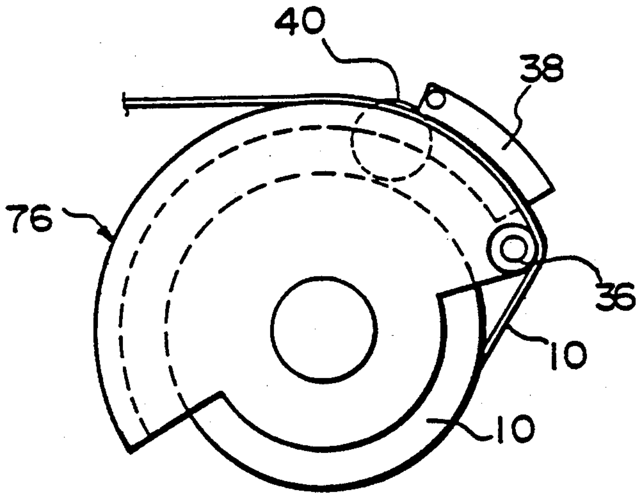

In the embodiment illustrated in FIG. 4, about half of the drum has been removed to form a half-drum 76. As in the first embodiment a receiver 10 roll is mounted coaxially in the half-drum 76. The arrangement and function of the guide roller 36, gripper 38 and cam 40 are more or less the same as those of the counterparts in FIG. 1. The print receiver 10 is fed out by the guide roller 36 from the cutaway portion of the drum.

The drum half is utilized to transport the print receiver 10 for printing purposes. The advantage of this configuration is that it is easy to insert and remove the rolls of receiver 10 from the cutaway side.

As described in the foregoing, with the color thermal printer according to this invention, when plural colors are to be printed on a receiver it is possible to adjust the position of the printing area with ease and precision by controlling the rotation of the drum which carries the print receiver. Also, the diameter of the platen roller can be reduced or otherwise set as desired, thereby enabling the printing performance of the thermal print-head to be enhanced.

The invention has been described in detail with particular reference to certain preferred embodiments thereof, but it will be understood that variations and modifications can be effected within the spirit and scope of the invention.

What is claimed is:

1. A color thermal printer comprising:

a platen roller;

a printing section having a platen roller and a movable thermal print-head which is arranged in opposition to the platen roller and which is movable between open and printing positions;

an ink donor film overlaid on a print receiver and having a multiplicity of colored inks, which is moved in unison with the movement of the print receiver through a transfer section formed by a gap between the platen roller and the open thermal print-head;

a drum arranged in the vicinity of the printing section which can be controllably rotated in two directions, the drum having a wall provided with an aperture, receiver support means provided in the interior of the drum for mounting a roller of print receiver so that the print receiver passes through such aperture;

gripper means located exterior to the drum which rotates together with the drum and is switchable between clamping the print receiver against the drum and releasing the print receiver;

means coupled to the drum for rotating the drum to transport the print receiver through the transfer section;

wherein when the receiver is being wound on said support means, the print-head is in a closed position and presses the donor film and receiver against the platen roller and the gripper means clamps the receiver to the drum so that colored ink is electively transferred to the receiver while the print receiver is being moved in contact with the drum.

2. The printer of claim 1 further including print receiver cutters for cutting a completed color print to provide a printed cut sheet.

* * * * *